(12) United States Patent
Zerod et al.

(10) Patent No.: US 10,330,484 B2
(45) Date of Patent: Jun. 25, 2019

(54) CORRELATING A ROUTE WITH A NETWORK OPERATION

(71) Applicants: Richard David Zerod, Chelsea, MI (US); Eric Staszel, Northville, MI (US)

(72) Inventors: Richard David Zerod, Chelsea, MI (US); Eric Staszel, Northville, MI (US)

(73) Assignee: VISTEON GLOBAL TECHNOLOGIES, INC., Van Buren Township, MI (US)

( * ) Notice: Subject to any disclaimer, the term of this patent is extended or adjusted under 35 U.S.C. 154(b) by 0 days.

(21) Appl. No.: 15/192,089

(22) Filed: Jun. 24, 2016

(65) Prior Publication Data

US 2017/0370737 A1 Dec. 28, 2017

(51) Int. Cl.
| | |
|---|---|
| *H04W 40/02* | (2009.01) |
| *H04W 4/029* | (2018.01) |
| *H04W 24/06* | (2009.01) |
| *G01C 21/34* | (2006.01) |
| *H04W 4/02* | (2018.01) |
| *H04L 1/00* | (2006.01) |
| *H04W 4/04* | (2009.01) |
| *H04W 84/12* | (2009.01) |
| *H04W 88/08* | (2009.01) |

(52) U.S. Cl.
CPC ........ *G01C 21/3453* (2013.01); *H04L 1/0018* (2013.01); *H04W 4/027* (2013.01); *H04W 4/029* (2018.02); *H04W 4/046* (2013.01); *H04W 4/023* (2013.01); *H04W 24/06* (2013.01); *H04W 40/026* (2013.01); *H04W 84/12* (2013.01); *H04W 88/08* (2013.01)

(58) Field of Classification Search
CPC ..... H04W 4/046; H04W 84/12; H04W 88/08; G01C 21/3453
USPC ....................................................... 701/522
See application file for complete search history.

(56) References Cited

U.S. PATENT DOCUMENTS

| | | | |
|---|---|---|---|
| 6,314,365 B1 * | 11/2001 | Smith | G01C 21/30 340/988 |
| 7,305,245 B2 | 12/2007 | Alizadeh-Shabdiz et al. | |
| 7,403,762 B2 | 7/2008 | Morgan et al. | |
| 2009/0186610 A1 * | 7/2009 | Avni | H04W 24/08 455/425 |
| 2010/0323715 A1 | 12/2010 | Winters | |
| 2014/0067257 A1 * | 3/2014 | Dave | G01C 21/3461 701/423 |
| 2014/0094187 A1 * | 4/2014 | LaMarca | G01S 5/0236 455/456.1 |
| 2014/0257695 A1 * | 9/2014 | Annapureddy | G01C 21/00 701/537 |
| 2015/0215832 A1 | 7/2015 | Fitzpatrick | |

(Continued)

OTHER PUBLICATIONS

Zill, Brian, etal., Understanding WIFi-Based Connectivity from Moving Vehicles, JMC-07, Oct. 24-26, 2007, San Diego, California, USA (Copyright 2007; 6 pages total).

*Primary Examiner* — Krishnan Ramesh
(74) *Attorney, Agent, or Firm* — Dickinson Wright PLLC

(57) ABSTRACT

A method and system for correlating a route with an external Wi-Fi network connection is disclosed herein. The aspects disclosed herein include generating information about the correlation, and employing the correlation for network operations, such as, communicating a file (or files), allowing communication from a vehicle, and/or performing routine updates via a vehicle.

16 Claims, 11 Drawing Sheets

(56) References Cited

U.S. PATENT DOCUMENTS

| | | | | |
|---|---|---|---|---|
| 2015/0312722 | A1* | 10/2015 | Mori | H04W 4/028 |
| | | | | 455/456.3 |
| 2016/0183059 | A1* | 6/2016 | Nagy | H04W 4/028 |
| | | | | 455/456.5 |
| 2016/0291119 | A1* | 10/2016 | Lamarca | G01S 5/0236 |
| 2017/0205243 | A1* | 7/2017 | Moore | G06F 16/29 |

* cited by examiner

| PARAMETERS | | VARIABLES | |
|---|---|---|---|
| 210 — POSITION | LATITUDE | LONGITUDE |
| 211 — TIME | DATE | HOUR, MIN, SEC. |
| 212 — TRAVEL DIRECTION | DEGREES | |
| 213 — TRAVEL SPEED | MILES OR KM PER HOUR | FEET OR METERS PER SECOND |
| 214 — NETWORK NAME | SSID | |
| 215 — ACCESS POINT | ESSID | |
| 216 — SUPPORTED DATA RATES | MIN. MBIT/SEC. | MAX. MBIT/SEC. |
| 217 — PING TX | YES OR NO | PAYLOAD SIZE (BYTES) | POWER LEVEL |
| 218 — PING RX | YES OR NO | LATENCY | SIGNAL LEVEL/QUALITY |

*FIG. 2*

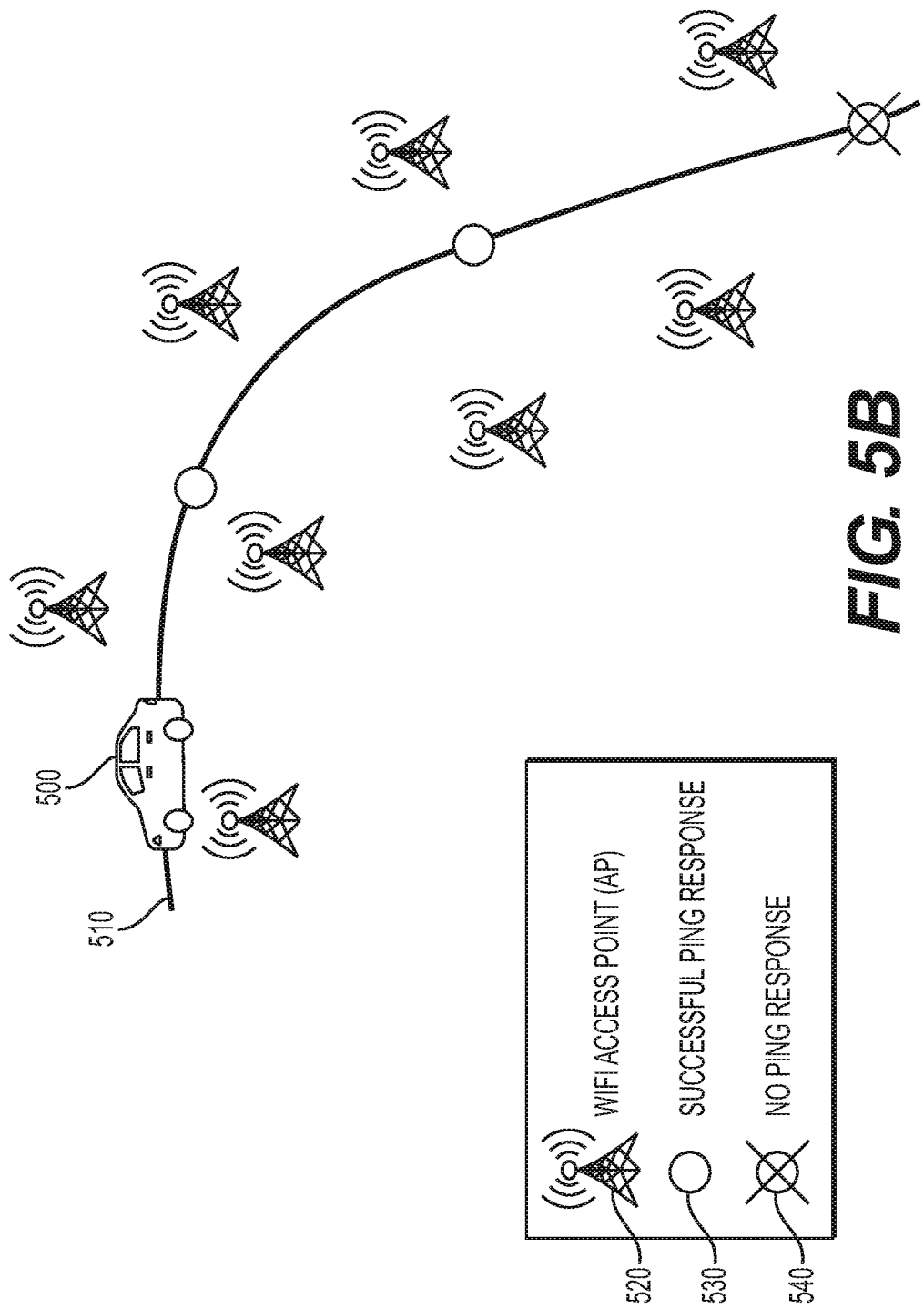

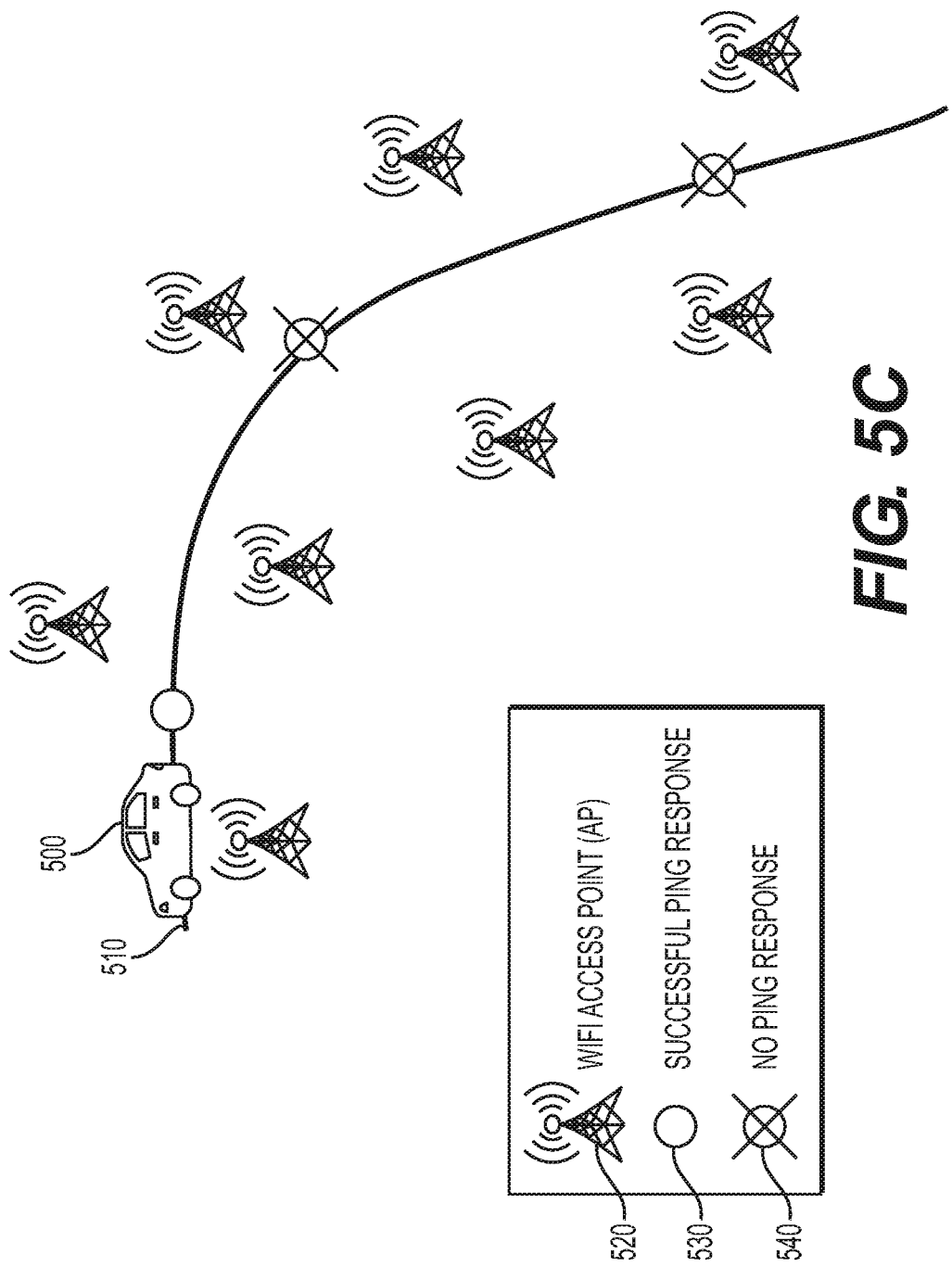

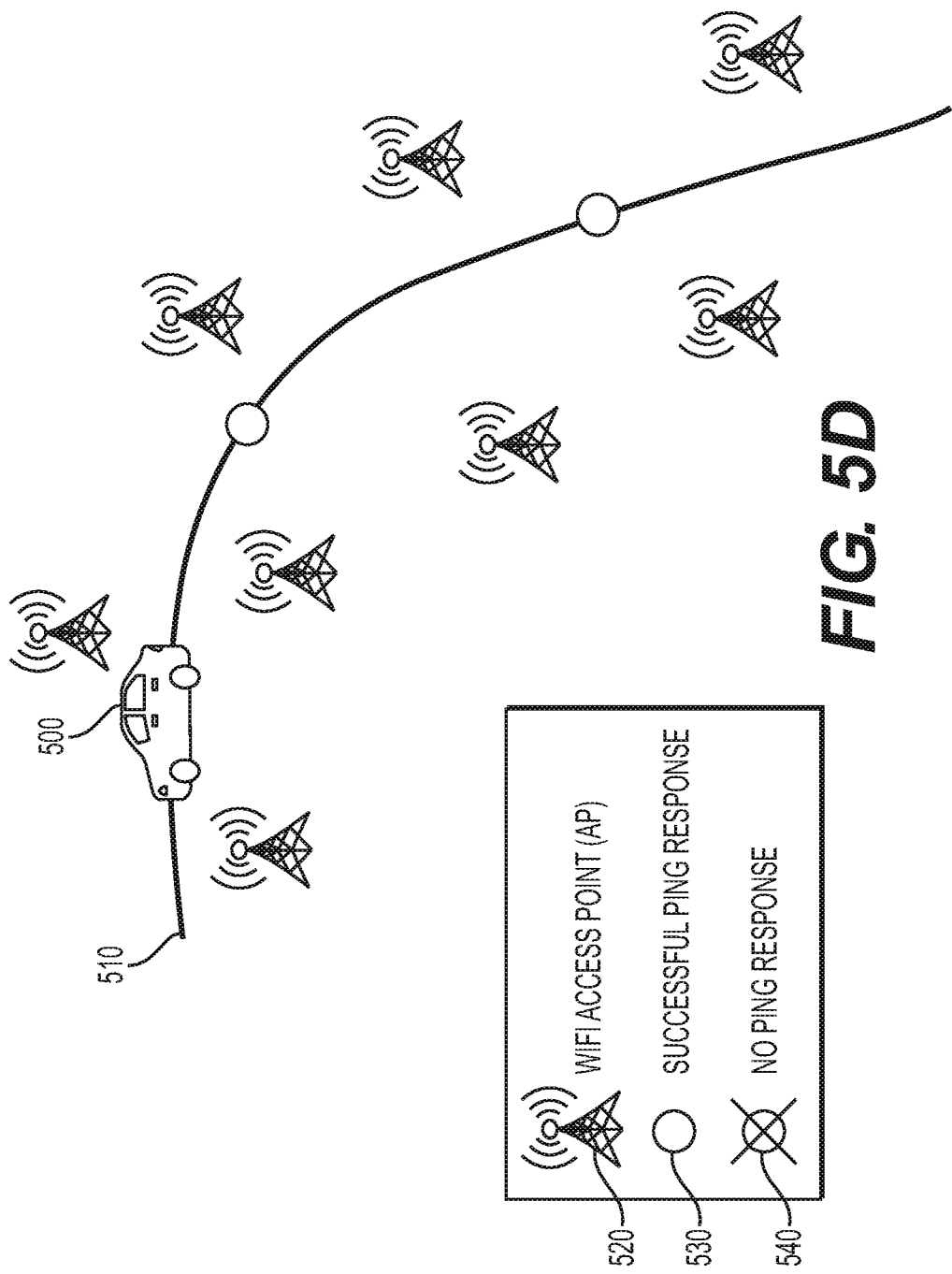

CORRELATING A ROUTE WITH A NETWORK OPERATION

BACKGROUND

Mobile connectivity is becoming more common place. Conventionally, a person would have a computing device at their home or office, and connect over a wired medium to a network or data providing service.

In recent years, wireless access points have become more common place. Many restaurants, locations, and communities are providing wireless access points that allow a user of a mobile device to connect via a wireless network to a network or internee server.

As such, users are capable or are able to connect to the Internet servers, and share and access information. Thus, a user can utilize this network connection on the go to download information for a meeting, perform a diagnostic, or any other application that requires a wireless network.

Vehicles with network connectivity are becoming more common. The vehicle has conventionally been disconnected from networks, but is now being provided with various telematics control units use Wi-Fi or cellular radios. The Wi-Fi radio allows the user to connect their vehicular control unit to the Internet through an external wireless access point connection. The cellular radio performs the same function employing a cell tower based data link.

However, even with the introduction of these wireless access points and the like, ensuring that data integrity occurs when a vehicle is connected to an external Wi-Fi access point and travels from point A to point B has not been fully achieved.

SUMMARY

The following description relates to a system and method for correlating a route with external Wi-Fi network connectivity.

Disclosed herein is a system for correlating a route with a network of external Wi-Fi access points. The system includes the following, in response to a vehicle travelling the route, at least one of a plurality of geographic points, a recordation of Wi-Fi network connectivity is made; and the Wi-Fi network connectivity is stored for each of the plurality of geographic points in which a recordation is made.

In another example of the system, the plurality of geographic points are established based on a predetermined metric. The metric may be time-based or distance based.

In another example of the system, the network connection quality is defined as a latency measurement associated with a throughput speed in a connected network.

In another example of the system, the latency and throughput speed measurements are associated with the speed or direction of the vehicle.

In another example of the system, in response to being at one of the plurality of geographic points, scanning for beacon frames; determining a network based on the scanned for beacon frames; attempting a connection to the network; in response to the connection being successful, pinging the network through a generated signal from the vehicle; storing the network connectivity based on the response; and correlating a present location based on an in-vehicle global positioning satellite (GPS) with the network connectivity. Further, these operations may be performed iteratively.

In another example of the system, a route is demarcated into a plurality of geographic regions; based on the network connectivity measured, each of the plurality of geographic regions is associated with a maximum data size limit.

Also disclosed herein is a system for correlating a geographic route with a network of external Wi-Fi access points, with the system including the following operations: receiving and transferring data over the external Wi-Fi network of a predetermined size; and in response to a vehicle travelling the route, determining whether the data is communicable based on a previous correlation of network connectivity and the route.

In another example of the system above, while traversing a route in a vehicle, and in response to a request to communicate data, the system is configured to determine a geographic region on the route to perform the communication of the data.

In another example of the system above, the determination of the data being communicable is based on both bandwidth available, and whether a network associated with the route is on a 'white-list'.

In another example of the system above, the determination further comprises estimating whether the data is communicable by also factoring in the speed of the vehicle and the direction of the vehicle.

In another example of the system above, the route comprises at least a first geographic region and a second, the first region being associated with a first minimum bandwidth, and the second region being associated with a second minimum bandwidth, wherein the first minimum bandwidth and the second minimum bandwidth differ from each other.

Further objects, features and advantages of this invention will become readily apparent to persons skilled in the art after a review of the following description, with reference to the drawings and claims that are appended to and form a part of this specification.

BRIEF DESCRIPTION OF THE DRAWINGS

FIG. 2 illustrates an example table of the data employable with the system shown in FIG. 1;

FIGS. 5(a)-(d) illustrate an example implementation of the processor of FIG. 1 implementing the method of FIG. 3;

DETAILED DESCRIPTION

Figure 1:
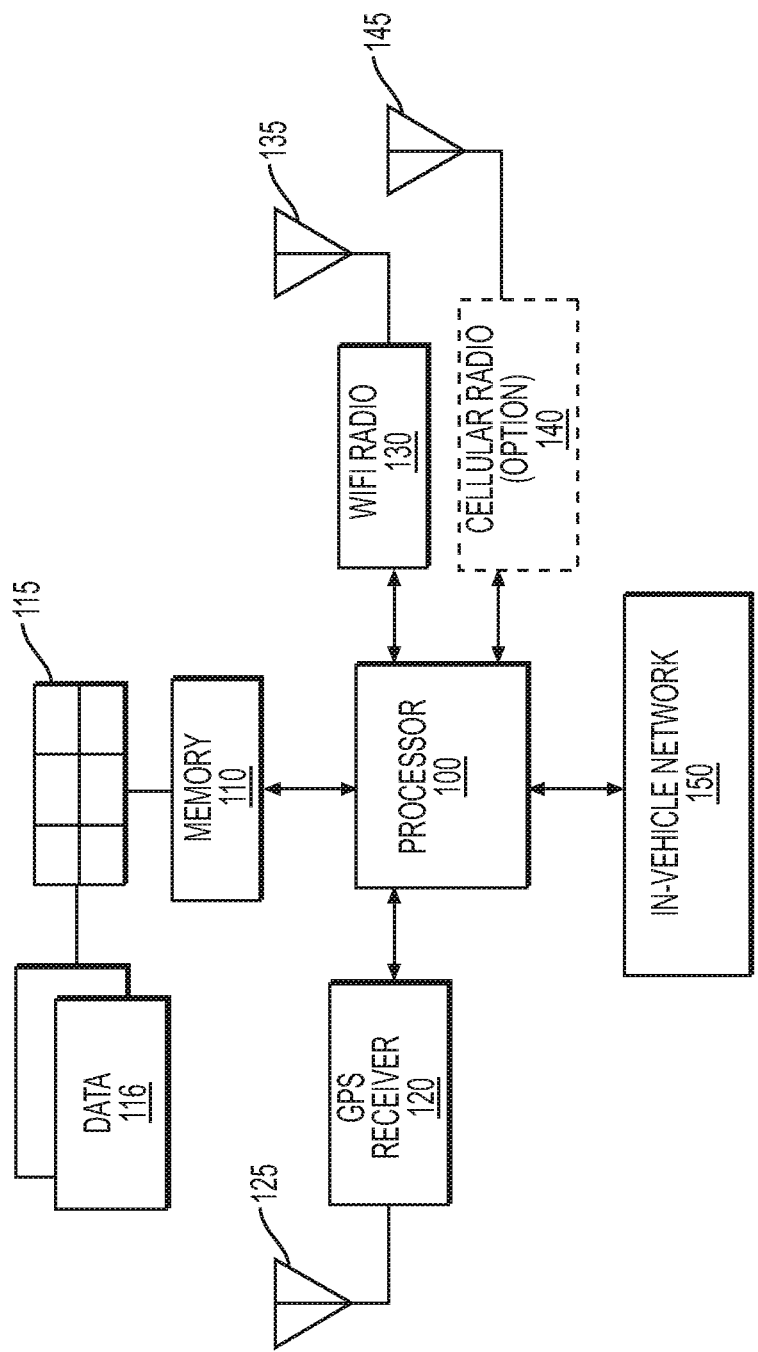
FIG. 1 illustrates an example of a circuit-based implementation according to the aspects disclosed herein.

The invention is described more fully hereinafter with references to the accompanying drawings, in which exemplary embodiments of the invention are shown. This invention may, however, be embodied in many different forms and should not be construed as limited to the embodiments set forth herein. Rather, these exemplary embodiments are provided so that this disclosure is thorough, and will fully convey the scope of the invention to those skilled in the art. It will be understood that for the purposes of this disclosure, "at least one of each" will be interpreted to mean any combination the enumerated elements following the respective language, including combination of multiples of the enumerated elements. For example, "at least one of X, Y, and Z" will be construed to mean X only, Y only, Z only, or any combination of two or more items X, Y, and Z (e.g. XYZ, XZ, YZ, X). Throughout the drawings and the detailed description, unless otherwise described, the same drawing reference numerals are understood to refer to the same elements, features, and structures. The relative size and depiction of these elements may be exaggerated for clarity, illustration, and convenience.

As explained in the background section, vehicle telemetry is becoming more common place. A vehicle may perform a background process of updating a component, an application, or any related software associated with the vehicle while the user is driving. However, if the user drives from point A to point B and the route associated with the travel from point A to point B does not provide enough network bandwidth, the vehicle and the associated applications will not download/upload the required data associated with the update.

Thus, incorporating the processes of uploading and downloading in the above manner is often times frustrated. In certain cases, the user or vehicle may not be able to download the file, thereby wasting valuable network resources associated with the process. In other cases, the user or the vehicle may request or desire that said network operations are performed solely on specific communication mediums or through authorized hotspots and Wi-Fi access points.

For example, if a user in a vehicle is performing a transfer of critical or sensitive information, said user may require or request that the information only be delivered via trusted communication means.

Thus, there is a need to ensure that data communicated from point A to B is not only communicable, but also ensured to be communicated via the proper and or predetermined or authorized communication points.

Disclosed herein are devices, systems, and methods for correlating routes with known or estimated networks and network available bandwidth. By employing the aspects disclosed herein, an operator of a vehicle and the various vehicular systems may achieve data communication that is more consistent and secure.

FIG. 1 illustrates an example of a processor 100 implementation according to the aspects disclosed herein. The processor 100 may be modified with instructions and steps shown in FIGS. 3 and 4, which is described in greater detail below. The system shown in FIG. 1 is exemplary, and one of ordinary skill in the art may appreciate the other system architectures commonly associated with vehicular implementations may be employed.

The processor 100 performs a connection to various network sources through a multitude of available telemetric systems. Two examples of a telemetric system shown are a Wi-Fi radio 130 and a cellular radio 140. Each of the two radios, the Wi-Fi radio 130 and the cellular radio 140, are associated with a respective antenna 135 and an antenna 145.

The processor 100 receives various information associated with the operation of the vehicle, communicates with external parties through both of the radios shown in FIG. 1. The processor 100 is connected to the in-vehicle network 150, which allows the processor 100 to interact with, receive information, and control the various systems associated with the operation of the vehicle. The processor 100 communicates requests from the in-vehicle network 150, such as requests for various information (e.g. media files and personal information), requests for upgrades of vehicle-based applications, requests to communicate messages, and the like.

Also shown in FIG. 1 is a GPS receiver 120. The GPS receiver 120 has an associated antenna 125, employed to connect to a GPS satellite. The GPS receiver 120 receives data used to calculate the location of the vehicle from antenna 125. The processor 100 may control the GPS receiver 120, thereby requesting real time notification of the present location based on a request.

Also shown in FIG. 1 is a memory 110. The memory 110 is electrically coupled to the processor 100. The memory 110 includes a lookup table 115 that has various data 116 associated with the system shown within. FIG. 2 illustrates the various types of data that may be employed with a system shown in FIG. 1.

As shown in FIG. 2, in table 200, there are two columns, parameters 201 and variables 202. With each location where an operation on the system shown in FIG. 1 is performed, some or all of these various parameters and variables may be recorded.

The parameters 201 may include the position 210, the time 211, the travel direction 212, the travel speed 213, the network name 214, the access point 215, the supported data rates 216, whether there was a ping TX 217, or whether there was a ping RX 218.

The variables 202 shown indicate and define the types of data that may be associated with the various parameters 201. An implementer of the processor 100 shown in FIG. 1 may determine what combinations of parameters 201/variables 202 may be implemented.

Figure 3:
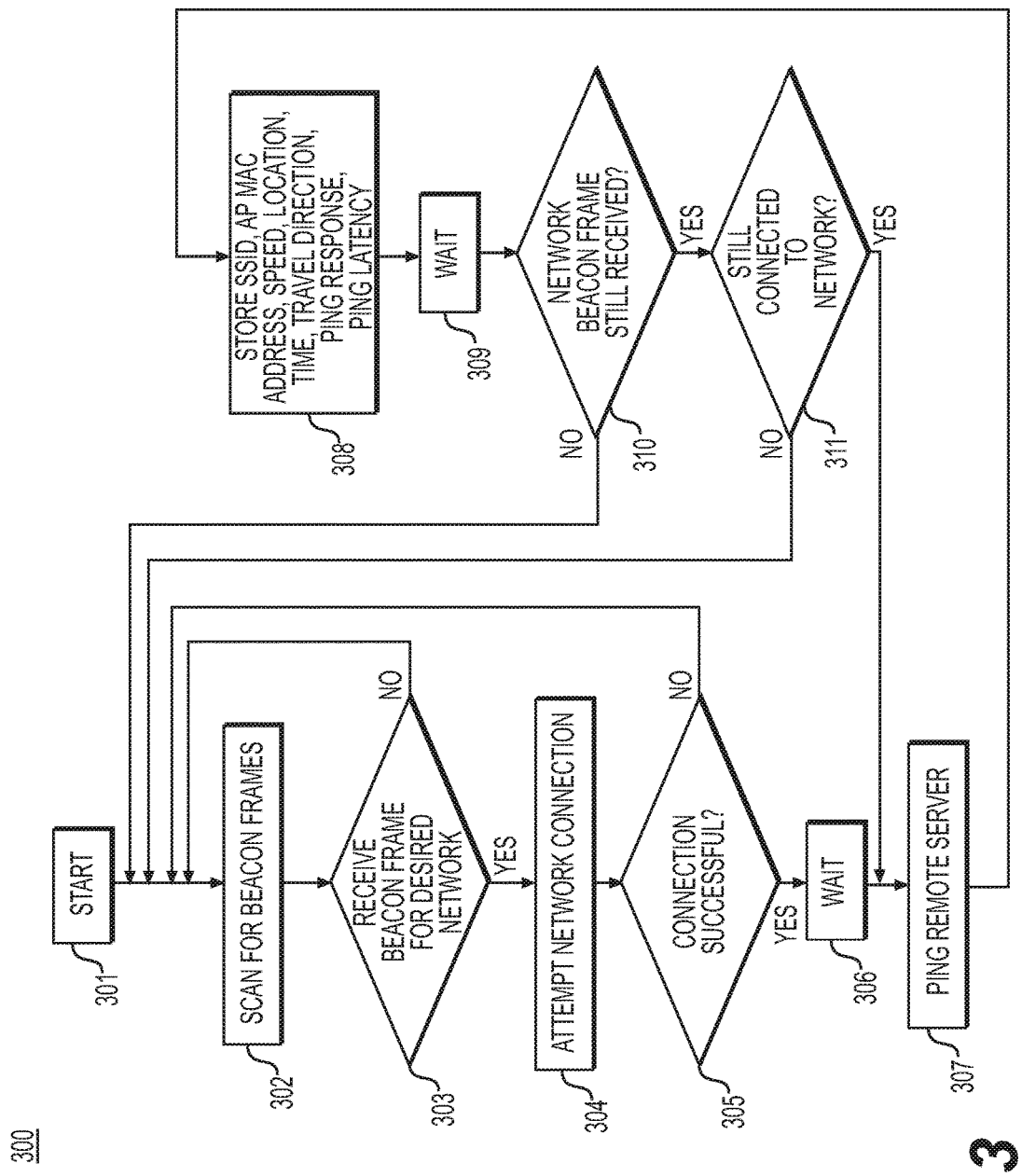
FIG. 3 illustrates a method for generating a database employing the aspects of the system shown in FIG. 1.

FIG. 3 illustrates a method 300 for generating a database associated with the aspects disclosed herein. The processor 100 may be incorporated with method 300, to perform at least one part of the aspects disclosed herein.

After starting a database operation generation process (operation 301), the method 300 proceeds to an operation of scanning for beacon frames (302). In operation 301, the decision to start the operations associated with method 300 may occur at predetermined intervals, or stochastically along a route. By measuring stochastically, if the same route is driven over a few days, various points along the route may be generated or updated.

In operation 302, the method 300 instigates a function which scans for beacon frames (for example, either randomly or in predetermined geographic regions using the Wi-Fi radio 130 or in specific geographic regions obtained from external data sources imported from the cellular radio 140). By performing the scanning operation, a profile of all available and connectable network locations may be determined.

In operation 303, a determination is made as to whether any of the beacon frames received correspond to an authorized or predetermined desired network. If yes, the method 300 proceeds to operation 304. If no, the method 300 proceeds to operation 302 where operations 302 and 303 are iteratively performed. The "white-list" of authorized or predetermined desired networks may be set by an implementer of processor 100 according to the aspects disclosed herein. In one example, the "white-list" may be limited to access points from a specific provider and/or company. In another implementation, the "white-list" may encompass all accessible 'Wi-Fi' connectable sources.

In operation 304, an attempt to connect to the network identified in operation 303 is made. In operation 305, a determination is made as to whether the network connection was successful. If no, the method 300 proceeds to operation 302.

In certain cases, multiple authorized networks may be available for connection. In these situations, the processor 100 may employ a heuristic to determine which network to connect to, such as the strongest signal, or a predetermined priority list.

If the network connection is successful, the method 300 proceeds to operation 306, where the system shown in FIG. 1 is configured to wait for a predetermined time. In operation 307, a remote server is pinged using the network connection established in operation 304.

Once the remote server is pinged, in operation 308, the various aspects associated with said ping are stored such as one, some or all the variables parameters shown in FIG. 2. By employing standard network analysis techniques, the vehicle is capable of determining the network connection quality associated with the ping using the collected data associated with the variables in operation 308.

As such, based on where the ping was generated, the vehicle is able to correlate in a real-time setting what the network capabilities are at that location based on a recorded GPS reading 120. Thus, data associated with both the GPS receiver 120 and information from the Wi-Fi radio 130 is correlated.

Also, by using the speed, travel direction, and some of the other aspects associated with the vehicle's movement, the actual location(s) associated with the operation may be correlated and enhanced. For example, if a ping response was received 30 seconds after the ping was transmitted, the system may record dissimilar or unique Wi-Fi network characteristics based on the speed and travel direction data from operation 308.

In operation 309, the method 300 is configured to wait a predetermined time. After which, a determination is made as to whether the network beacon frame is still received (310). If no, the method 300 proceeds back to operation 302, where the previous operations are iteratively performed.

If yes, the method 300 proceeds to operation 311, where a determination is made as to whether the vehicle is still connected through the network it was connected to above.

If yes, the operations from 307 and onward are performed again. If no, the method 300 proceeds back to operation 302 to be performed iteratively again.

Thus employing the operations described above, when a route, for example from point A to point B is traversed, the method 300 may be employed to create a database recording various aspects of network connectivity correlated at various locations with parameters such as latency, the availability of a Wi-Fi network, and the like.

In the embodiment described above, the wait times in operation 306 and 309 are set at a predetermined amount. However, constantly generating ping information may be too consuming a process on a vehicle's system or produce an unnecessary amount of Wi-Fi network traffic congestion. Thus, in an alternate embodiment, the pings may be configured to be generated randomly or in a staggered fashion.

For example, if a person travels from point A to point B on a daily basis, the database generation process may be configured to generate pings and record information associated with said pings at different locations each day based on a random or stochastic data acquisition process. The random or stochastic processes that are employed may be any that are known to one of ordinary skill in the art.

Figure 4:
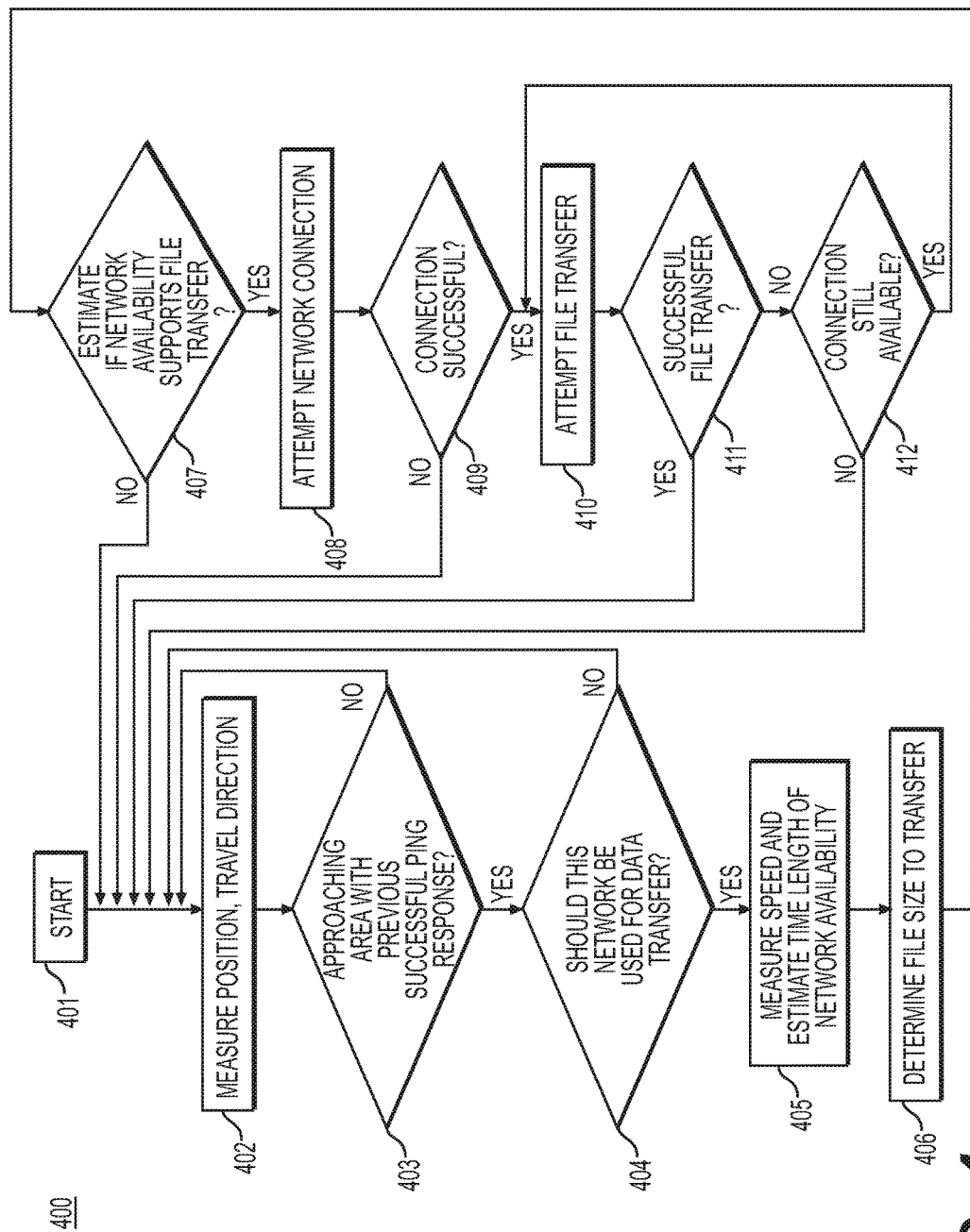
FIG. 4 illustrates an example of a method for employing a generated database according to the aspects shown in the system of FIG. 1.
Figure 5A:
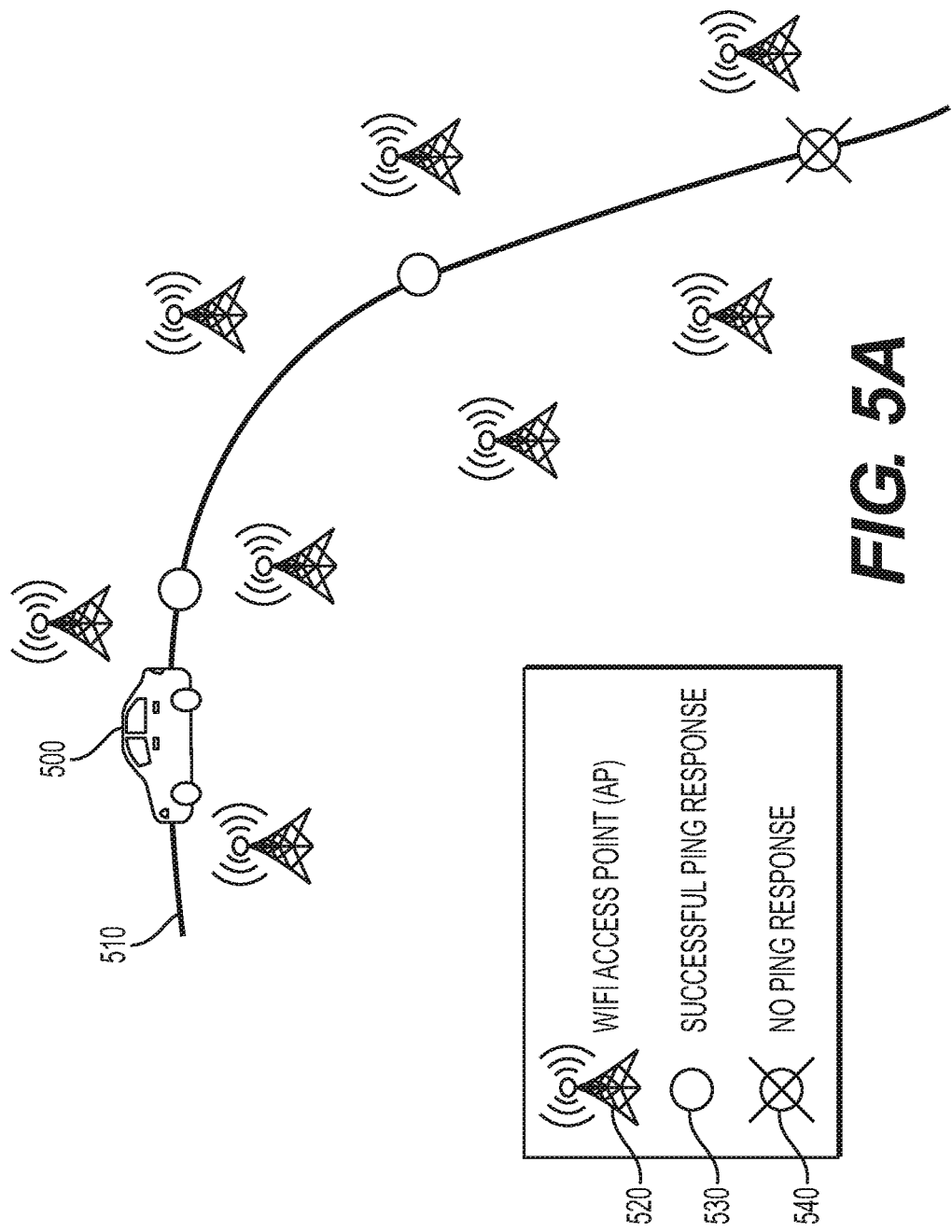

FIG. 4 illustrates a second embodiment of an implementation of the processor 100 according to the aspects disclosed herein. Method 400 may be employed with the data acquired and gathered with the aspects disclosed with method 300. Alternatively, the data set may be previously generated from another vehicle or provided from a vehicle's manufacturer, and made available to a vehicle associated with processor 100 employing method 400.

In operation 401, method 400 is instructed to start. The decision to start method 400 may be associated with various triggers, such as a need to transmit a file while a vehicle is going from a predetermined route A to B.

In operation 402, the actual route location and travel direction is determined from the predetermined route provided by the operator of the vehicle associated with processor 100. As such, the processor 100 is configured to be aware of the distance associated with the travel from a hypothetical point A to a hypothetical point B. In addition to being entered, the processor 100 may employ an estimation technique to determine if the vehicle is on a specific or previously traveled route.

In operation 403, the processor 100 determines whether a route is associated with acquired data, such as described with method 300. If no, the method 400 proceeds to operation 402, where the operations associated with 402 and 403 may iteratively be performed.

If yes, the method 400 proceeds to operation 404. In operation 404, a determination is made as to whether networks connected to real-time detections of the vehicle's current location on a route are authorized to perform the given instructions. For example, if an operation associated with the instigation of method 400 is only authorize-able on a subset of wireless access points, and it is determined (i.e. from the collection of information from method 300) that there are no authorized network access points, the determination in operation 404 is no.

If no, the method 400 iteratively proceeds to operation 402. If yes, the method 400 proceeds to operation 405.

In operation 405, an estimation is made regarding the speed associated with the available network connections, and the time frame associated with the available networks (i.e. using the current speed of the vehicle, a determination is made as to how long the network or networks will be available). For example, using the various acquired data points associated with the various pings, the processor 100 may estimate the network speed associated with a predetermined route. Furthermore, a predetermined route may be demarcated into various regions (which will be shown in FIG. 6). Within these regions, the amount of network availability for a specific portion of a predetermined route may be determined.

In operation 406, the size of the file or files associated with the network operation instigated in method 400 is determined. The size of the file or files is recorded for further operations of method 400.

In operation 407, a determination is made as to whether the network is available to support a file transfer of the size determined in operation 406. For example, the length of time the network will be available (correlated to vehicle speed) and the data rate of the network can be used to estimate the maximum file size that could be transferred. A determination is made as to whether the current location of the vehicle on the route provides network availability adequate to perform the file transfer operation completely and correctly. If no, the method 400 proceeds back to operation 402.

For example, if the vehicle requires to communicate a file of 'X' size, and based on the estimations, the amount of bandwidth available supports a transfer size of 'Y' amount (correlating the average speed of the vehicle or current speed of the vehicle), a decision to proceed with the file transfer may be made.

If yes, the method 400 proceeds to operation 408 in which an attempt to establish a network connection is made. If the connection is successful, in operation 409, the method 400 proceeds to operation 410. If no, the method 400 proceeds to operation 402.

Method 400 then proceeds to operation 410, in which an attempt to transfer the file or files is made. In operation 411, a determination is made as to whether the file transfer is successful. If no, the method 400 proceeds to operation 412. If yes, the method 400 proceeds to operation 402, and awaits an instigation of a start 401 of the method 400 based on another requested network operation.

In operation 412, if the file transfer was not successful, a determination is made as to whether the network connection is still available. If yes, the method 400 proceeds to operation 410 where the file transfer is attempted again, and operations 411 and 412 are iteratively re-performed. If no, the method 400 proceeds back to operation 402 to iteratively perform the operations of method 400 again.

The following figures depict various example implementations of the aspects disclosed above. In FIGS. 5(a)-(d), and FIG. 6, a sample route is shown over four days of travel. In all of the figures, a vehicle 500 implementing processor 100 is shown.

Figure 6:
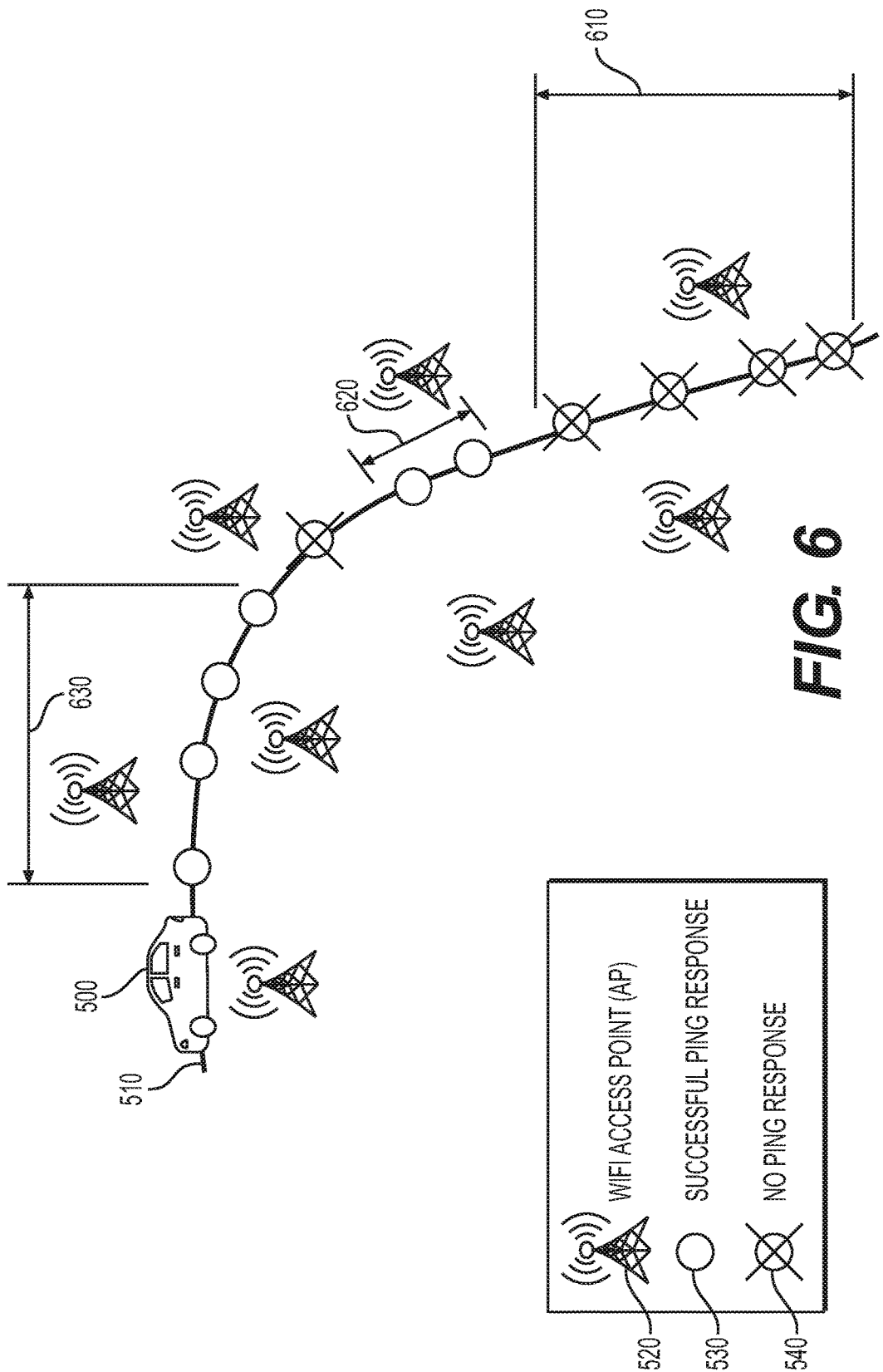
FIG. 6 illustrates the example implementation of FIGS. 5(a)-(d) further.

In FIGS. 5(a)-(d), method 300 is incorporated into processor 100 with the cumulative data acquisition shown in FIG. 6 as the resultant performance of four days of data acquisition.

In each of FIGS. 5(a)-(d), the vehicle 500 travels a route 510. This route 510 may be, for example, a vehicle 500 owner's route to and from work. As shown over all four days, random points are pinged, with the ping message being communicated to various wireless access points 520 along the route.

As shown in the legend, the successful ping responses are shown with symbol 530 while the unsuccessful ping responses are shown with symbol 540.

Although not indicated herein, other information associated with the ping messages may be collected, such as which wireless access points are being connected to or are available, the speed of connection associated with each wireless access point, or other information explained herein or known in the field of network connectivity measurement.

As shown in FIG. 6, the various data collected over four days is shown. In FIG. 6, as shown in region 610, the ability to connect to wireless access points is either not possible or severely limited. In region 620, there is a small location where Wi-Fi coverage is available. In region 630, the area of coverage is significantly longer and as such may be used for longer file transfers.

Figure 7A:
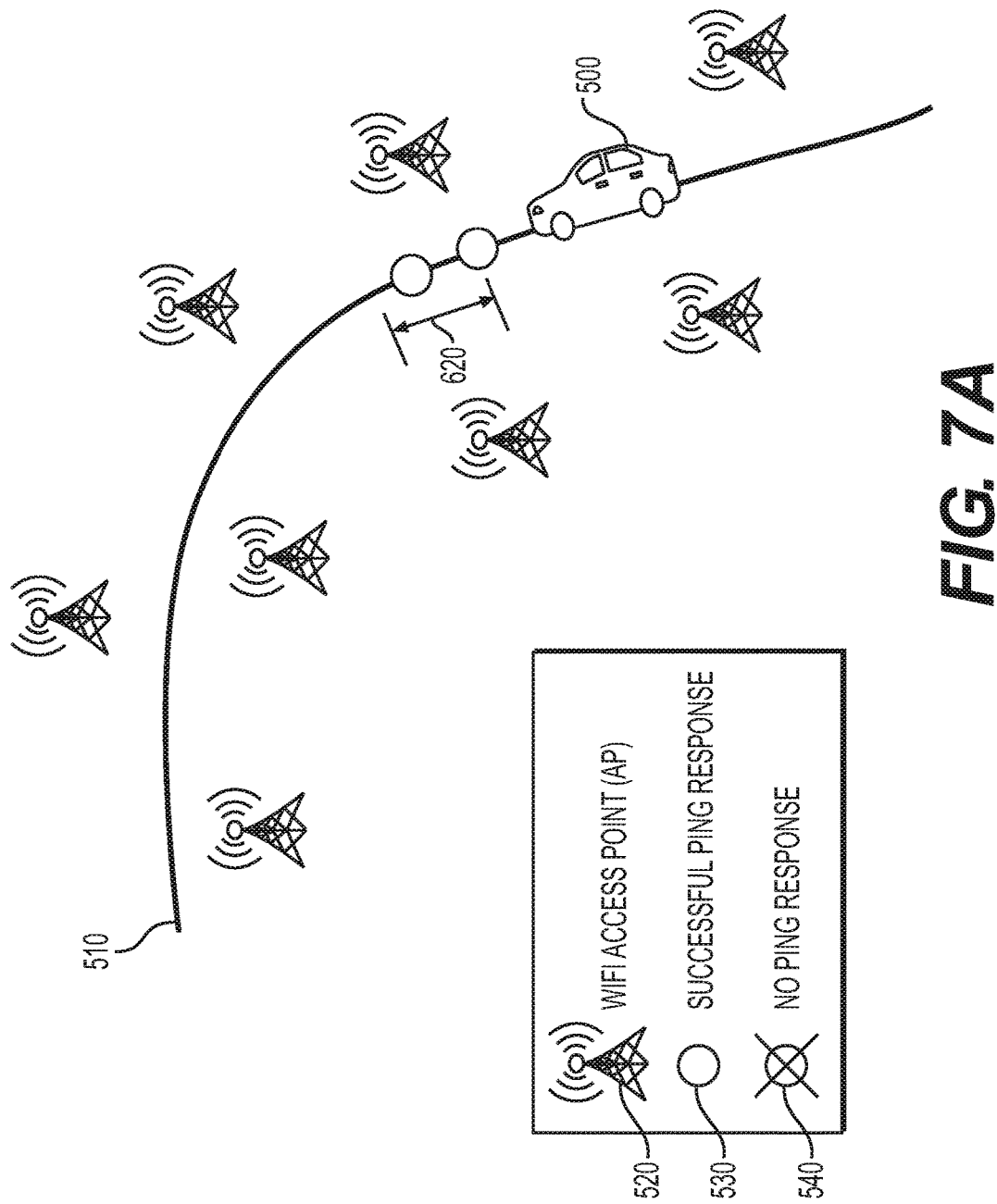
FIGS. 7(a)-(b) illustrate an example implementation of the processor of FIG. 1 implementing the method of FIG. 4.

FIGS. 7(a) and (b) illustrate an example of a vehicle 500 employing processor 100 incorporating at least method 400. In this example, the vehicle 500 may have previously been provided with the data acquired from the employment of method 300 (as shown in FIGS. 5(a)-(d)).

As shown in FIG. 7(a), the vehicle 500 traverses through the region 620. For example, if the network operation associated with vehicle 500 is a small file transfer, employing the aspects of method 400, a determination may be made that it is possible to perform said operation while the vehicle is driving in region 620.

Figure 7B:
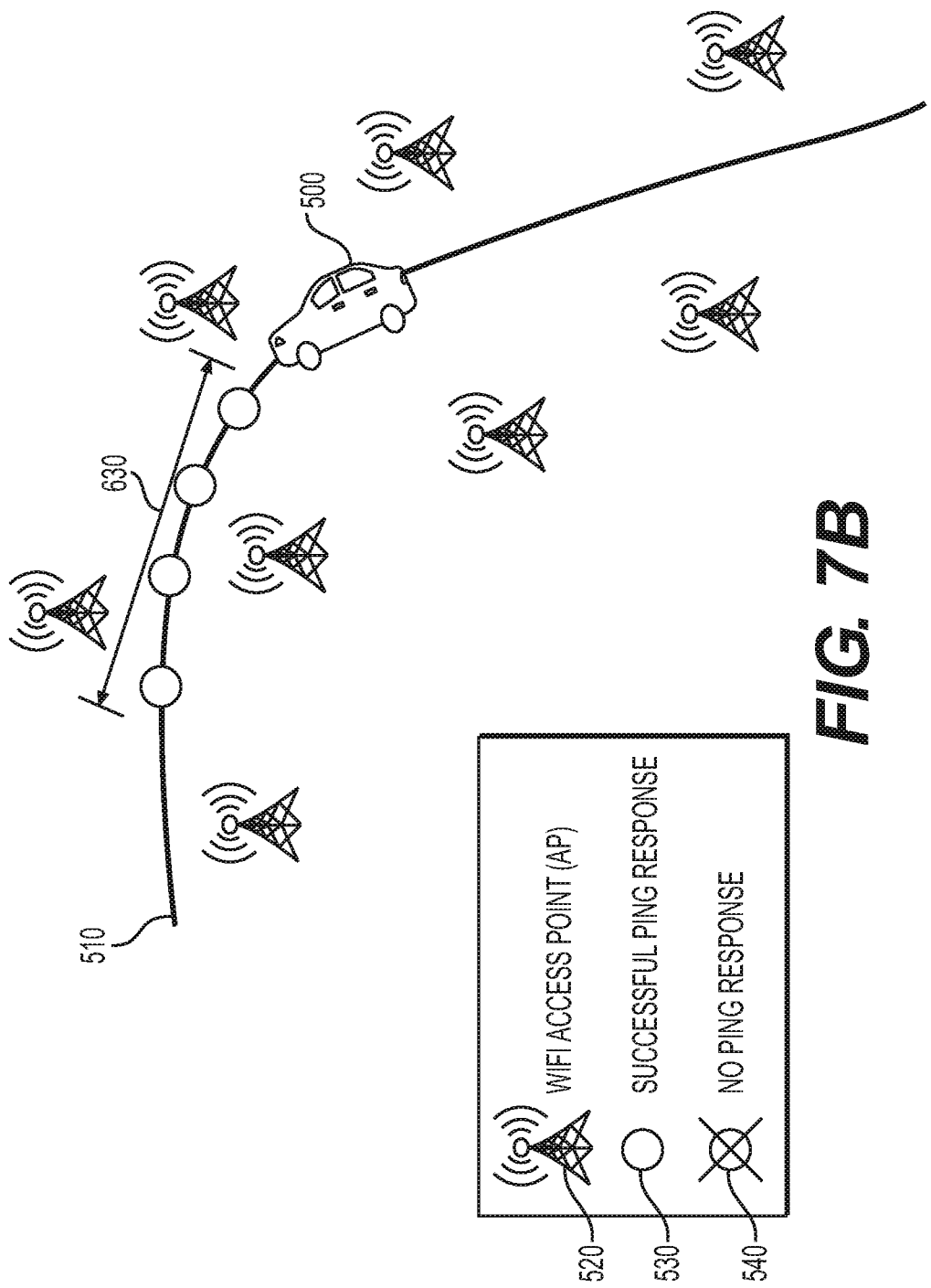

However, if a network operation involves transferring a much larger file size, once again the method 400 may be employed to determine that the operation should only happen in region 630, which is shown in FIG. 7(b). As such, the vehicle 500 may employ method 400 to instigate the network operation while within the area associated with region 630 based on the probability of the network operation being successful while traversing region 630.

Thus, employing the aspects disclosed herein, a vehicle employing processor 100 may perform data transfer operations in a more reliable, secure, and consistent manner. As such, various applications, instigated by either a vehicular background update process or a driver/passenger associated with the vehicle, may be performed in a more optimal manner.

For example, if the vehicle's information system requires an update, and the estimated size of the update is known or provided from a previous network operation, the update may be configured to download at a predetermined region of a known route.

Additionally, if a driver is driving from point A to B and needs to upload a meeting presentation of a fixed size, the upload may also be configured to occur during a selected region based on the aspects disclosed herein.

Certain devices shown in FIG. 1 include a computing system. The computing system includes a processor (CPU) and a system bus that couples various system components including a system memory, such as read only memory (ROM) and random access memory (RAM), to the processor. Other system memory may be available for use as well. The computing system may include more than one processor or a group or cluster of computing systems networked together to provide greater processing capability. The system bus may be any of several types of bus structures including a memory bus or memory controller, a peripheral bus, and a local bus using any of a variety of bus architectures. A basic input/output (BIOS) stored in the ROM or the like, may provide basic routines that help to transfer information between elements within the computing system, such as during start-up. The computing system further includes data stores, which maintain a database according to known database management systems. The data stores may be embodied in many forms, such as a hard disk drive, a magnetic disk drive, an optical disk drive, tape drive, or another type of computer readable media which can store data that is accessible by the processor, such as magnetic cassettes, flash memory cards, digital versatile disks, cartridges, random access memories (RAMs) and, read only memory (ROM). The data stores may be connected to the system bus by a drive interface. The data stores provide nonvolatile storage of computer readable instructions, data structures, program modules and other data for the computing system.

To enable human (and in some instances, machine) user interaction, the computing system may include an input device, such as a microphone for speech and audio, a touch sensitive screen for gesture or graphical input, keyboard, mouse, motion input, and so forth. An output device can include one or more of a number of output mechanisms. In some instances, multimodal systems enable a user to provide multiple types of input to communicate with the computing system. A communications interface generally enables the computing device system to communicate with one or more other computing devices using various communication and network protocols.

The preceding disclosure refers to a number of flow charts and accompanying descriptions to illustrate the embodiments represented in FIGS. 3 and 4. The disclosed devices, components, and systems contemplate using or implementing any suitable technique for performing the steps illustrated in these figures. Thus, FIGS. 3 and 4 are for illustration purposes only and the described or similar steps may be performed at any appropriate time, including concurrently, individually, or in combination. In addition, many of the steps in these flow charts may take place simultaneously and/or in different orders than as shown and described. Moreover, the disclosed systems may use processes and methods with additional, fewer, and/or different steps.

Embodiments disclosed herein can be implemented in digital electronic circuitry, or in computer software, firmware, or hardware, including the herein disclosed structures and their equivalents. Some embodiments can be implemented as one or more computer programs, i.e., one or more modules of computer program instructions, encoded on a tangible computer storage medium for execution by one or more processors. A computer storage medium can be, or can be included in, a computer-readable storage device, a computer-readable storage substrate, or a random or serial access memory. The computer storage medium can also be, or can be included in, one or more separate tangible components or media such as multiple CDs, disks, or other storage devices. The computer storage medium does not include a transitory signal.

As used herein, the term processor encompasses all kinds of apparatus, devices, and machines for processing data, including by way of example a programmable processor, a computer, a system on a chip, or multiple ones, or combinations, of the foregoing. The processor can include special purpose logic circuitry, e.g., an FPGA (field programmable gate array) or an ASIC (application-specific integrated circuit). The processor also can include, in addition to hardware, code that creates an execution environment for the computer program in question, e.g., code that constitutes processor firmware, a protocol stack, a database management system, an operating system, a cross-platform runtime environment, a virtual machine, or a combination of one or more of them.

A computer program (also known as a program, module, engine, software, software application, script, or code) can be written in any form of programming language, including compiled or interpreted languages, declarative or procedural languages, and the program can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

To provide for interaction with an individual, the herein disclosed embodiments can be implemented using an interactive display, such as a graphical user interface (GUI). Such GUI's may include interactive features such as pop-up or pull-down menus or lists, selection tabs, scannable features, and other features that can receive human inputs.

The computing system disclosed herein can include clients and servers. A client and server are generally remote from each other and typically interact through a communications network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

It will be apparent to those skilled in the art that various modifications and variation can be made in the present invention without departing from the spirit or scope of the invention. Thus, it is intended that the present invention cover the modifications and variations of this invention provided they come within the scope of the appended claims and their equivalents.

We claim:

1. A system, comprising:
a data store comprising a non-transitory computer readable medium storing a program of instructions for performing a process;
a processor that executes the program of instructions to perform the process, the process comprising:
recording external Wi-Fi network connectivity at a plurality of points along a route, in response to a vehicle travelling the route, wherein the route is demarcated into a plurality of regions;
storing the external Wi-Fi network connectivity for each of the plurality of points in which a recordation is made;
associating, based on the network connectivity measured, each of the plurality of regions with a data size limit;
receiving the route as an input;
determining whether to perform a data transfer based on the data size limit associated with the route being equal to or larger than data required to perform the data transfer; and
performing the data transfer based on the determination of whether to perform the data transfer.

2. The system according to claim 1, wherein the plurality of points are established based on a predetermined metric.

3. The system according to claim 2, wherein the metric is time-based.

4. The system according to claim 2, wherein the metric is distance based.

5. The system according to claim 1, wherein the network connectivity is defined as a latency measurement associated with a throughput speed associated with a connected network.

6. The system according to claim 5, wherein the latency measurement is correlated with the speed or direction of the vehicle.

7. The system according to claim 1, the process further comprising:
in response to being at one of the plurality of points, scanning for Wi-Fi beacon frames;
determining an external W-Fi network based on the scanned for beacon frames;
attempting a connection to the external Wi-Fi network;
in response to the connection being successful, pinging the network through a generated signal from the vehicle;
storing the Wi-Fi network connectivity based on the response; and
correlating a present location based on an in-vehicle global positioning satellite (GPS) measurement with the external Wi-Fi network connectivity.

8. The system according to claim 1, the process further comprising an iterative operation of the correlation in response to a determination that the network is still connected.

9. The system according to claim 1, wherein the data is associated with a vehicle-based system update, and the vehicle-based system update occurs in response to an occupant of the vehicle entering the route and after the determination.

10. A system, comprising:
a data store comprising a non-transitory computer readable medium storing a program of instructions for performing a process;
a processor that executes the program of instructions to perform the process, the process comprising:
recording external Wi-Fi network connectivity at a plurality of points along a route, in response to a vehicle travelling the route, wherein the route is demarcated into a plurality of regions;
storing the external Wi-Fi network connectivity for each of the plurality of points in which a recordation is made;
associating, based on the network connectivity measured, each of the plurality of regions with a data size limit;
receiving, at the vehicle, an external Wi-Fi network operation to communicate data of a predetermined size;
determining, in response to the vehicle travelling the route, whether the data is communicable based on the association of the plurality of regions and the data size limit, by establishing whether an amount of bandwidth associated with the route is equal to or greater than an amount required to download the data; and
communicating the data by the vehicle based on the determination of whether the data is communicable.

11. The system according to claim 10, the process further comprising:
determining a region on the route to perform the communication of the data based on the association of the plurality of regions and the data size limit.

12. The system according to claim 11, wherein the route comprises at least a first region and a second region, the first region being associated with a first minimum bandwidth, and the second region being associated with a second minimum bandwidth, wherein the first minimum bandwidth and the second minimum bandwidth differ from each other.

13. The system according to claim 10, wherein the determination of the data being communicable is based on both bandwidth available, and whether a network associated with the route is on a white list.

14. The system according to claim 10, wherein the determination further comprises estimating whether the data is communicable by also factoring in a speed of the vehicle and a direction the vehicle is traveling.

15. A system, comprising:
a Wi-Fi radio configured to connect to Wi-Fi networks;
a global positioning system receiver configured to provide a current location of a vehicle;
a data store comprising a non-transitory computer readable medium storing a program of instructions for performing a process;
a processor that executes the program of instructions to perform the process, the process comprising:
recording external Wi-Fi network connectivity at a plurality of points along a route using the Wi-Fi radio and the global positioning system receiver, in response to a vehicle travelling the route, wherein the route is demarcated into a plurality of regions;
storing the external Wi-Fi network connectivity for each of the plurality of points in which a recordation is made;
associating, based on the network connectivity measured, each of the plurality of regions with a data size limit;
receiving the route as an input;
determining whether to perform a data transfer based on the data size limit associated with the route being equal to or larger than data required to perform the data transfer; and
performing the data transfer based on the determination of whether to perform the data transfer.

16. The system of claim 15, further comprising:
a cellular radio configured to connect to cell towers, wherein the process further comprises identifying the plurality of points by importing from an external data source over the cellular radio.

* * * * *